United States Patent
Rockelmann

(10) Patent No.: US 11,932,093 B2
(45) Date of Patent: Mar. 19, 2024

(54) ROLLER BLIND ARRANGEMENT WITH WINDING SHAFT HOLLOW TUBE

(71) Applicant: Webasto SE, Stockdorf (DE)

(72) Inventor: Andreas Rockelmann, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 525 days.

(21) Appl. No.: 16/640,815

(22) PCT Filed: Aug. 10, 2018

(86) PCT No.: PCT/EP2018/071754
§ 371 (c)(1),
(2) Date: Feb. 21, 2020

(87) PCT Pub. No.: WO2019/042742
PCT Pub. Date: Mar. 7, 2019

(65) Prior Publication Data
US 2021/0129639 A1    May 6, 2021

(30) Foreign Application Priority Data
Aug. 29, 2017   (DE) ..................... 10 2017 119 767.2

(51) Int. Cl.
*B60J 7/00*     (2006.01)
*B60J 1/20*     (2006.01)
(Continued)

(52) U.S. Cl.
CPC ........... *B60J 7/0015* (2013.01); *B60J 1/2052* (2013.01); *B60R 5/047* (2013.01); *E06B 2009/2488* (2013.01); *E06B 9/44* (2013.01)

(58) Field of Classification Search
CPC ........ B60J 7/0015; B60J 1/2052; B60J 1/205; B60J 1/2063; B60J 1/2041; B60R 5/047; E06B 9/44; E06B 2009/2488; E06B 9/42
See application file for complete search history.

(56) References Cited

U.S. PATENT DOCUMENTS

| | | | | |
|---|---|---|---|---|
| 4,463,755 A | * | 8/1984 | Suzuki | A61M 16/0858 128/911 |
| 4,500,284 A | * | 2/1985 | Lupke | B29C 48/303 156/244.14 |

(Continued)

FOREIGN PATENT DOCUMENTS

| | | |
|---|---|---|
| DE | 102004041385 A1 | 3/2005 |
| DE | 102007011414 A1 | 9/2008 |

(Continued)

OTHER PUBLICATIONS

International Preliminary Report on Patentability for PCT/EP2018/071754, dated Mar. 3, 2020, English translation submitted herewith (6 pages).

(Continued)

*Primary Examiner* — Abe Massad
(74) *Attorney, Agent, or Firm* — Fitch, Even, Tabin & Flannery, LLP

(57) ABSTRACT

A roller blind arrangement for a motor vehicle, having a roller blind web and a winding shaft onto which the roller blind web can be wound and from which the roller blind web can be unwound and which has a flexible hollow tube arrangement penetrated by a bearing beam attached to the vehicle. The hollow tube arrangement may have a hollow tube element which, viewed in the axial direction, may have multiple flexible portions interrupted by at least one stabilizing portion having a greater torsional strength than the flexible portions.

8 Claims, 4 Drawing Sheets

(51) Int. Cl.
*B60R 5/04* (2006.01)
*E06B 9/24* (2006.01)
*E06B 9/44* (2006.01)

(56) References Cited

U.S. PATENT DOCUMENTS

| | | | | |
|---|---|---|---|---|
| 4,659,069 | A * | 4/1987 | Odobasic | F16F 1/14 |
| | | | | 267/141.1 |
| 5,324,557 | A * | 6/1994 | Lupke | B29C 48/0015 |
| | | | | 428/36.5 |
| 5,895,695 | A * | 4/1999 | Rowley | B29C 70/766 |
| | | | | 428/36.1 |
| 5,975,143 | A * | 11/1999 | Jarvenkyla | B32B 27/32 |
| | | | | 138/121 |
| 6,062,147 | A * | 5/2000 | Footitt | A47B 17/00 |
| | | | | 108/50.01 |
| 6,062,266 | A * | 5/2000 | Burkhardt | F01N 13/1816 |
| | | | | 138/143 |
| 6,216,742 | B1 * | 4/2001 | Masui | F16L 59/153 |
| | | | | 138/167 |
| 7,568,752 | B1 * | 8/2009 | Lin | B60J 1/2058 |
| | | | | 160/370.22 |
| 7,891,382 | B2 * | 2/2011 | Rushlander | F16L 11/112 |
| | | | | 138/119 |
| 8,420,943 | B1 * | 4/2013 | La | B60R 16/0222 |
| | | | | 174/152 G |
| 8,648,259 | B2 * | 2/2014 | Gniewek | H02G 3/0468 |
| | | | | 174/152 G |
| 8,651,166 | B1 * | 2/2014 | Daniels | E06B 9/44 |
| | | | | 160/250 |
| 8,899,300 | B2 * | 12/2014 | Daniels | E06B 9/44 |
| | | | | 160/250 |
| 9,127,791 | B2 * | 9/2015 | Ragner | D03D 3/06 |
| 9,341,289 | B1 * | 5/2016 | Maroschak | B29C 48/303 |
| 9,428,037 | B2 * | 8/2016 | Renz | B60J 1/208 |
| 9,920,598 | B2 * | 3/2018 | Lund | E21B 17/203 |
| 10,029,629 | B2 * | 7/2018 | Sekino | B60R 16/027 |
| 10,082,230 | B2 * | 9/2018 | Dieduksman | F16L 21/06 |
| 10,193,316 | B2 * | 1/2019 | Sugimoto | H01B 7/0045 |
| 10,889,166 | B2 * | 1/2021 | Hiramatsu | E06B 9/42 |
| 11,358,442 | B2 * | 6/2022 | Rockelmann | B60J 7/0015 |
| 2002/0011536 | A1 | 1/2002 | Peeters | |
| 2008/0178957 | A1 * | 7/2008 | Thomas | F16L 25/0036 |
| | | | | 138/123 |
| 2008/0216970 | A1 * | 9/2008 | Lin | B60J 1/205 |
| | | | | 160/262 |
| 2013/0249253 | A1 | 9/2013 | Kanai et al. | |
| 2016/0257184 | A1 * | 9/2016 | Van Boxtel | B60J 10/35 |
| 2019/0225059 | A1 * | 7/2019 | Hiramatsu | B60J 7/0015 |
| 2020/0086720 | A1 * | 3/2020 | Schuller | B60J 1/2052 |

FOREIGN PATENT DOCUMENTS

| | | |
|---|---|---|
| EP | 1160110 A2 | 12/2001 |
| EP | 2641762 A2 | 9/2013 |
| EP | 2529965 B1 | 3/2014 |
| WO | 03024729 A1 | 3/2003 |

OTHER PUBLICATIONS

International Search Report for PCT/EP2018/071754 dated Dec. 13, 2018 in English and German (5 pages).

* cited by examiner

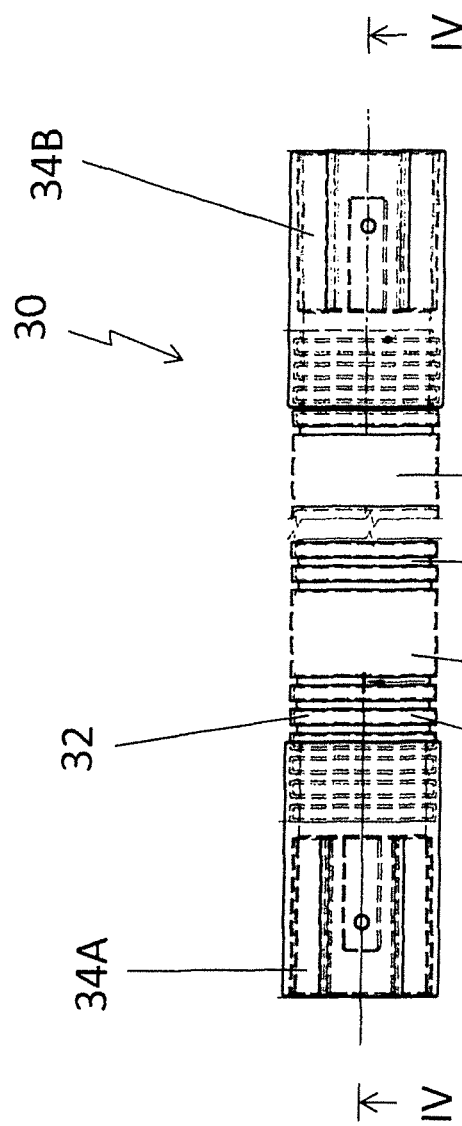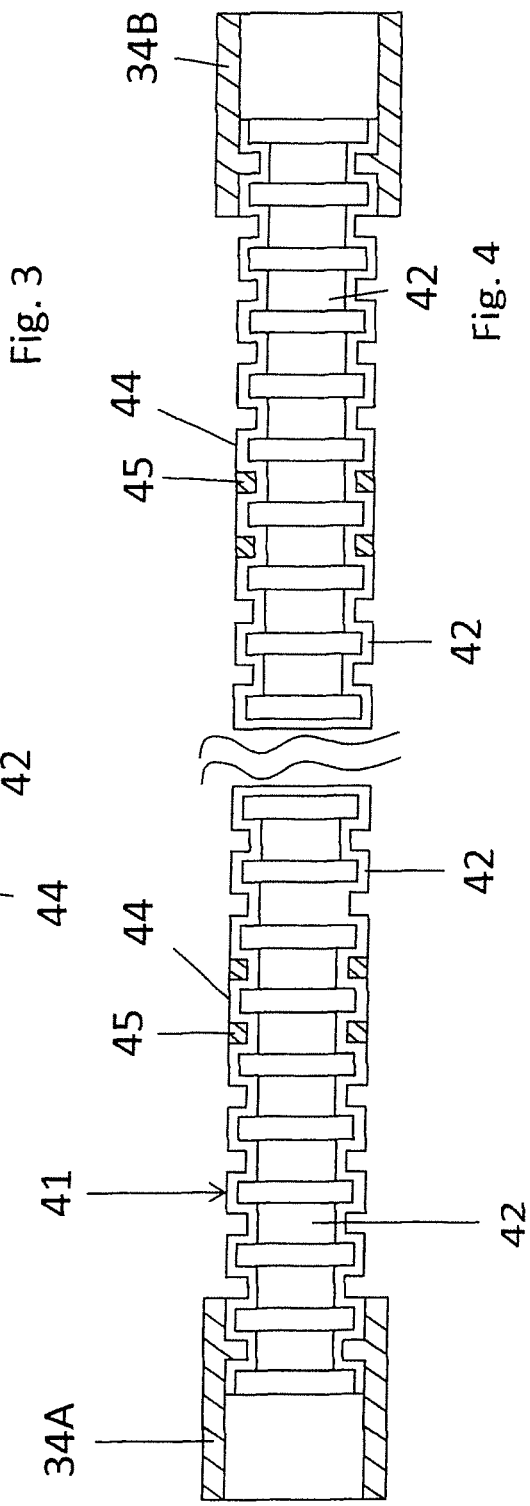

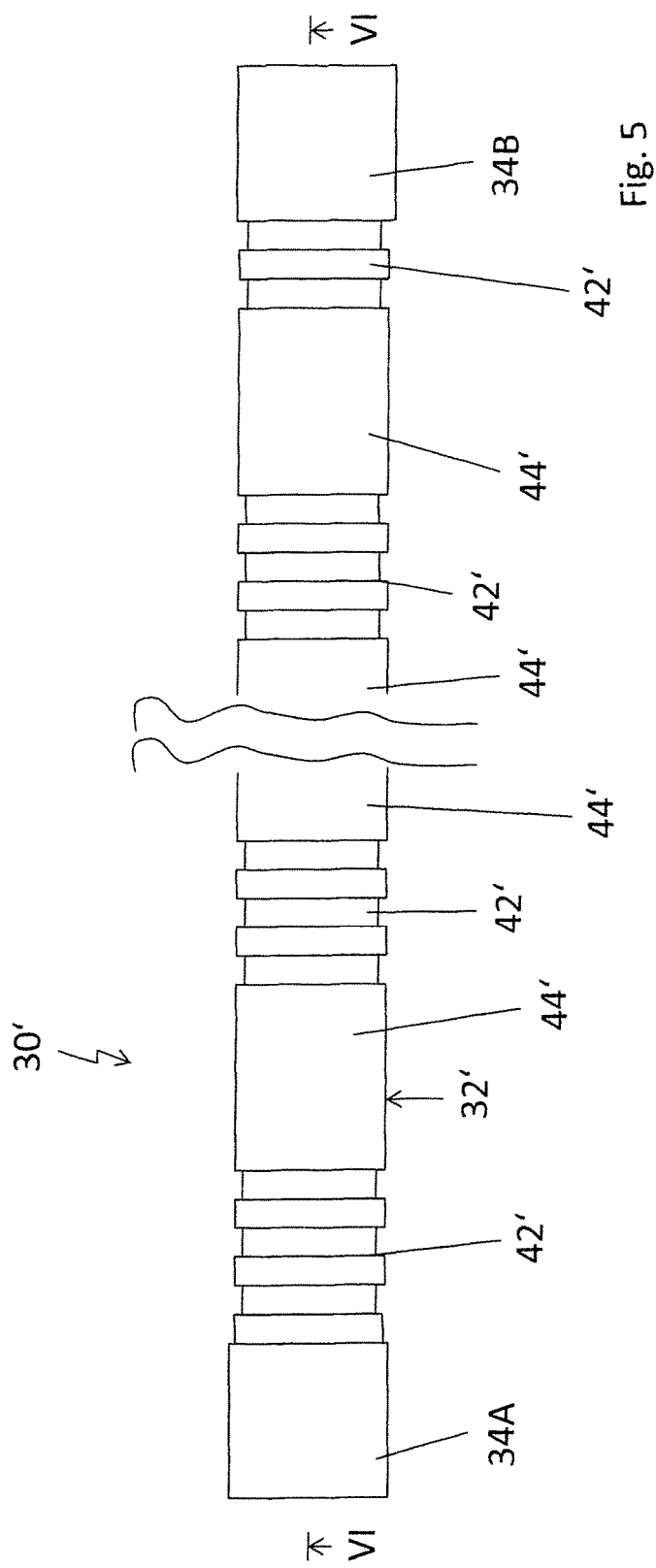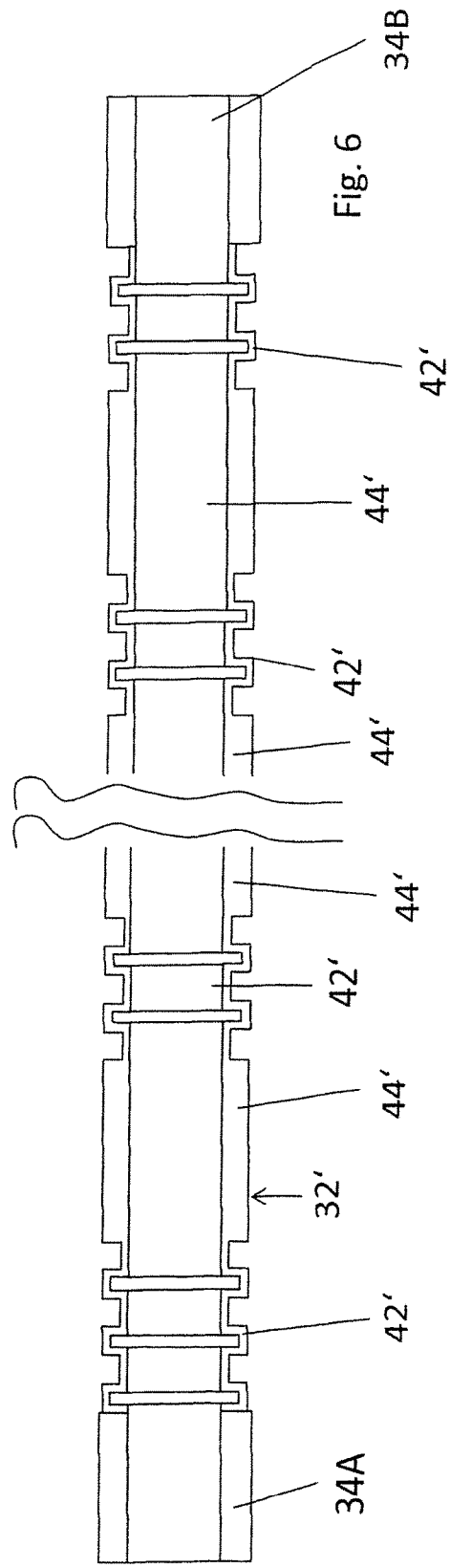

ROLLER BLIND ARRANGEMENT WITH WINDING SHAFT HOLLOW TUBE

CROSS-REFERENCE TO RELATED APPLICATIONS

This application is a U.S. national phase application filed under 35 U.S.C. § 371 of International Application No. PCT/EP2018/071754, filed 10 Aug. 2018, designating the United States, which claims priority from German Patent Application No. 10 2017 119 767.2, filed 29 Aug. 2017, which are hereby incorporated herein by reference in their entirety for all purposes.

FIELD

The invention relates to a roller blind arrangement having the features of the preamble of claim 1.

BACKGROUND

A roller blind arrangement of this kind is known from practice and is used in a motor vehicle to shade a transparent roof portion formed by a glass lid of a sunroof arrangement or by a fixed glass roof element, for example. The known roller blind arrangement comprises, as a shading element, a roller blind web which can be wound onto and unwound from a winding shaft in order to shade the transparent roof portion in question.

Furthermore, it is known for a winding shaft of a roller blind arrangement to be realized with a curved bearing beam attached to the vehicle and surrounded by a flexible hollow tube arrangement to which the roller blind web is connected at its edge extending in the transverse direction of the roller blind. The hollow tube arrangement forms a hub for the roller blind web and is pre-loaded in the winding direction by means of a winding spring so that the roller blind web will be wound onto the winding shaft automatically when a pull bar attached to the end of the roller blind web facing away from the winding shaft is released. Furthermore, the hollow tube arrangement may have a bearing bush at each of its bilaterally disposed ends, each bearing bush being rotatably mounted on a corresponding bearing part attached to the vehicle. If the roller blind arrangement is a laterally guided roller blind arrangement, the roller blind web has a guide tape at each of its lateral edges. In that case, each guide tape is guided in a guide rail attached to the vehicle and is fixed to one of the bearing bushes. Thus, the guide tapes are wound up in the area of the bearing bushes as the roller blind web is being wound up.

Furthermore, it is known for a hollow tube arrangement of a winding shaft to be composed of individual tube segments engaged with each other via teeth. However, this presents the disadvantage that undesirable noises may occur when the tube segments twist relative to each other. This is accompanied by the risk of a loss in smoothness of movement of the winding shaft due to jamming of the tube segments. Also, a winding shaft of this design is more difficult to install because of the large number of tube segments. Moreover, the tube segments may be outlined in the roller blind web, which becomes visible from the vehicle interior when the roller blind web is in the unwound state.

It is also known for a corrugated tube preloaded in the winding direction by means of a winding spring to be used as a hollow tube. However, a hollow tube of this kind may elastically or even plastically deform because of its low torsional strength when transmitting torques. This, in turn, may lead to a relative offset of lateral guides disposed at the longitudinal edges of the roller blind web and thus to wrinkles and creases in the roller blind web, which may be compensated if the guide tapes used for lateral guiding are realized as constant force springs forming an additional drive for the hollow tube arrangement, which, however, increases the cost of the roller blind arrangement.

SUMMARY

The object of the invention is to provide a roller blind arrangement of the kind described above that comprises an optimized hollow tube arrangement of the winding shaft.

According to the invention, this object is attained by the roller blind arrangement having the features of claim 1.

The roller blind arrangement according to the invention thus comprises a hollow tube arrangement for the winding shaft that has a hollow tube element which, viewed in the axial direction, comprises multiple flexible portions interrupted by at least one stabilizing portion having a greater torsional stiffness than the flexible portions. The flexible portions of the hollow tube element ensure its flexibility, allowing the winding shaft as a whole to be curved and to follow a curvature of a vehicle roof while the hollow tube arrangement can still rotate on the bearing beam. The stabilizing portion, on the other hand, ensures that the hollow tube element is stiff enough to be able to transmit moments of torsion form one end to the other end of the hollow tube arrangement at least largely without tolerance. In that case, a hollow tube arrangement driven by means of a winding spring does not require any additional constant force springs. The position of the stabilizing portion on the hollow tube element and the width of the stabilizing portion can be ideally set with respect to the torsion behavior of the hollow tube arrangement.

In a specific embodiment of the roller blind arrangement according to the invention, the hollow tube element comprises a base tube having a plastic overmolding for forming at least one stabilizing portion. The layer thickness of the plastic overmolding on the base tube may be low if a suitable plastic material is selected.

In particular, the base tube is a corrugated tube whose maximum outer radius, i.e., its radius in the area of the corrugation peaks, is equal to the radius of a circumferential surface of the plastic overmolding. Owing to the resulting low wall thickness of the plastic overmolding, the stabilizing portion can be prevented from being outlined on the roller blind web and from causing an increase in diameter of the roller blind roll formed by the roller blind web on the winding shaft in the area of the stabilizing portion. The corrugated tube is continuously homogenous, i.e. ribbed, on its inner side.

In an alternative embodiment of the roller blind arrangement according to the invention, the hollow tube is formed by a single-piece plastic tube comprising corrugated tube portions for forming the flexible portions and a smooth tube portion for forming the stabilizing portion.

The single-piece plastic tube can be produced by a method combining extrusion and blow-molding. For instance, extruded tubes made of a single component or of two components can be molded into blow-molded parts in a suitable blow mold, each blow-molded part having corrugated tube portions and at least one smooth tube portion. In particular, multiple corrugated tube portions and multiple smooth tube portions may be realized alternately. In the blow mold, the extruded tube is pushed against the mold walls from the inside by means of compressed air or is pulled against the mold walls by vacuum generation. The width and the position of the corrugated tube portions and of the at least one smooth tube portion can be optimized depending on the intended application. Since the smooth tube portion may be smooth not only on the outside but also on the inside, this embodiment is characterized by optimized noise behavior during rotation on the bearing beam attached to the vehicle.

The term "smooth tube portion" is to be interpreted in its broadest sense, which means that the smooth tube portion has an at least largely smooth outer surface, which may be interrupted, however, by small ribs or grooves.

In a preferred embodiment, the roller blind arrangement according to the invention is realized as a laterally guided roller blind whose roller blind web has a guide tape at each of its lateral edges with respect to a roller blind longitudinal center plane. The guide tapes may each be realized as a constant force spring forming a drive element for winding up the roller blind web.

In a specific embodiment of the roller blind arrangement according to the invention, the hollow tube element surrounds a winding spring connected to the bearing beam on one side and to the hollow tube arrangement on the other side. In particular, the winding spring is connected to a bearing bush of the hollow tube arrangement, the bearing bush being disposed on an end of the hollow tube element. Thus, the torque exerted on the bearing bush by the winding spring can be transmitted to the other end of the hollow tube element through the at least one stabilizing portion without the hollow tube element experiencing any substantial torsion that might lead to a loss in smoothness of movement of the laterally guided roller blind due to a relative offset of the bilaterally disposed guide tapes or to creases in the roller blind web.

A coupling element may be connected in a non-rotating manner between each of the bearing bushes and the hollow tube element of the hollow tube arrangement. In a specific embodiment of the roller blind arrangement according to the invention, each coupling element is formed by a plastic overmolding of the hollow tube element. The plastic overmolding for forming the coupling element can be produced together with the plastic overmolding for forming the at least one stabilizing portion. Thus, the different functional areas of the hollow tube arrangement can be formed in a single injection-molding procedure. Additional process steps are not required.

Other advantages and advantageous embodiments of the subject-matter of the invention are apparent from the description, the drawing and the claims.

BRIEF DESCRIPTIONS OF THE DRAWINGS

Exemplary embodiments of roller blind arrangements according to the invention are illustrated in the drawing in a schematically simplified manner and will be explained in more detail in the following description.

FIG. 3 is a top view of a hollow tube arrangement of the winding shaft;

FIG. 4 is a highly schematic section through the hollow tube arrangement of FIG. 3 along line IV-IV in FIG. 3;

FIG. 5 is a top view of an alternative embodiment of a hollow tube arrangement; and FIG. 6 is a section through the hollow tube arrangement of FIG. 5 along line VI-VI in FIG. 5.

DETAILED DESCRIPTION

Figure 1:
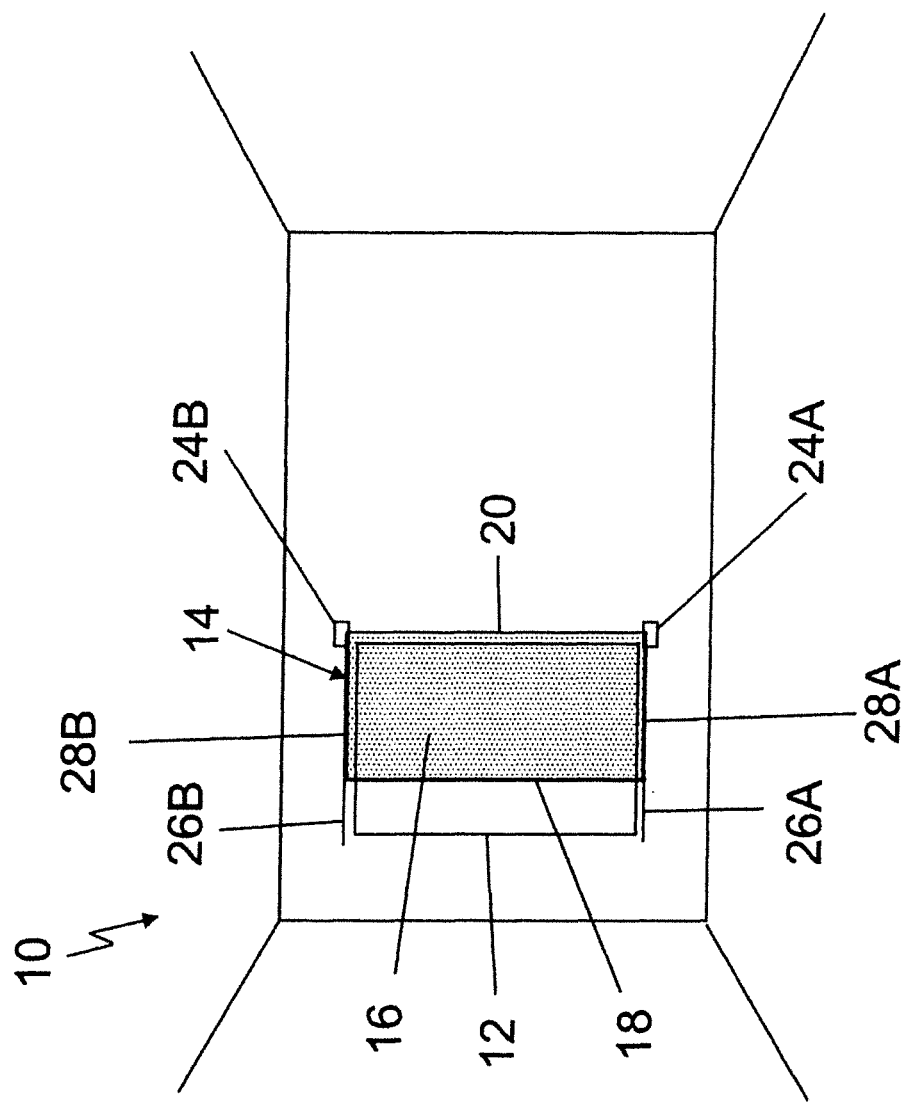
FIG. 1 is a top view of a vehicle roof having a roller blind arrangement according to the invention.

The drawing shows a vehicle roof 10 of a passenger vehicle not illustrated in more detail, vehicle roof 10 having a roof cutout 12 which can be closed by means of a lid element (not shown) or at least partially opened.

Figure 2:
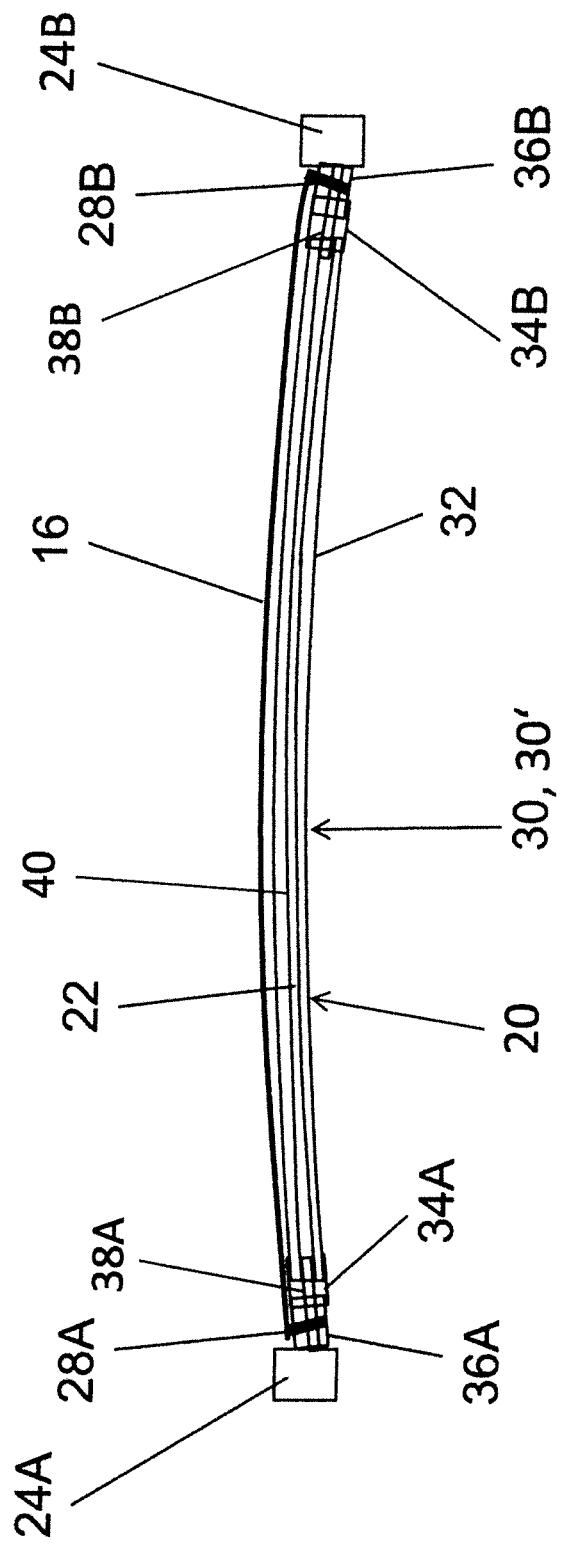
FIG. 2 is a schematic longitudinal section through a winding shaft of the roller blind arrangement.

Vehicle roof 10 comprises a roller blind arrangement 14 as a shading element for roof cutout 12, roller blind arrangement 14 having a roller blind web 16 made of a foldable or windable opaque fabric. At its free edge, roller blind web 16 has a pull bar 18 extending in the transverse direction of the vehicle. At its edge facing away from pull bar 18, roller blind web 16 is attached to a winding shaft 20 also extending in the transverse direction of the vehicle. Winding shaft 20, which is illustrated in detail by FIGS. 2 to 4, is curved in the transverse direction of the vehicle and comprises a curved bearing beam 22 attached to the vehicle and connected to vehicle-attached bearing elements 24A and 24B on either side of a vertical roller blind longitudinal center plane. Bearing elements 24A and 24B are disposed at the rear of respective guide rails 26A and 26B which extend in the longitudinal direction of the vehicle, i.e. in the pulling direction of roller blind web 16, and in which respective lateral edges of roller blind web 16 are guided via respective guide tapes 28A and 28B connected to roller blind web 16.

Winding shaft 20 of roller blind arrangement 14 comprises a flexible hollow tube arrangement 30 surrounding bearing beam 22. Hollow tube arrangement 30 comprises a flexible hollow tube element 32 which is made of plastic and whose ends disposed on either side of the vertical roller blind longitudinal center plane are provided with plastic overmoldings forming respective coupling elements 34A and 34B. Via coupling elements 34A and 34B, hollow tube element 32 is connected to respective bearing bushes 36A and 36B on both sides, bearing bushes 36A and 36B being mounted on respective bearing journals 38A and 38B which are part of bearing beam 22 and formed on respective bearing elements 24A and 24B.

In addition to the bilaterally disposed bearing journals 38A and 38B, bearing beam 22 comprises a central tube 40 connected to the two bearing journals 38A and 38B.

Hollow tube element 32 comprises a corrugated tube 41 as a base tube and is provided with respective coupling elements 34A and 34 at both ends. Viewed in the axial direction, hollow tube element 32 comprises multiple flexible portions 42 formed by the base tube or flexible corrugated tube 41 itself and interrupted by stabilizing portions 44. Flexible portions 42 define the flexibility of hollow tube element 32. Stabilizing portions 44, whose torsion stiffness or torsion strength is greater than that of flexible portions 42, comprise a corrugated tube portion of the base tube which is provided with an annular overmolding 45 of a dimensionally stable plastic.

Plastic overmoldings 45 of stabilizing portions 44 have a flat circumferential surface whose outer radius substantially corresponds to the outer radius of corrugated tube 41 in the area of flexible portions 42. Stabilizing portions 44 stiffen the base tube across their width, the total torsional stiffness of hollow tube element 32 thus being increased compared to a hollow tube element without stabilizing portions.

Coupling elements 34A and 34B also form plastic overmoldings of the corrugated tube and are formed on the corrugated tube in one process step with and in the same injection mold as plastic overmoldings 45 of stabilizing portions 44 during production.

FIGS. 5 and 6 show an alternative embodiment of a hollow tube arrangement 30' for a roller blind arrangement of the kind illustrated in FIGS. 1 and 2. Hollow tube arrangement 30' comprises a hollow tube element 32' which, like in the embodiment of FIGS. 2 to 4, is provided with respective coupling elements 34A and 34B at its two ends, each of coupling elements 34A and 34B forming a plastic overmolding of hollow tube element 32'.

Viewed in the axial direction, hollow tube element 32' comprises alternating flexible portions 42' and stabilizing portions 44' formed as single-piece parts in a method combining extrusion and blow molding. Flexible portions 42' are corrugated tube portions ensuring the flexibility of hollow tube element 32' by their ribs, allowing hollow tube arrangement 30' to be mounted rotatably on bearing beam 22. Stabilizing portions 44' are smooth tube portions having a smooth outer surface and a smooth inner surface and exhibiting increased stiffness and increased torsional strength compared to flexible portions 42', thus increasing the total torsional strength of hollow tube arrangement 30'. Thus, a torque introduced, for example, into coupling element 34A or into bearing bush 36A by a winding spring can be transmitted to coupling element 34B and to bearing bush 36B without any substantial torsion of hollow tube arrangement 30'. This, in turn, ensures that guide tapes 28A and 28B can be wound onto hollow tube arrangement 30' synchronously and without offset together with roller blind web 16 and that a loss in smoothness of movement of the roller blind arrangement and creases in roller blind web 16 can be avoided.

REFERENCE SIGNS 10 vehicle roof
12 roof cutout
14 roller blind arrangement
16 roller blind web
18 pull bar
20 winding shaft
22 bearing beam
24A, 24B bearing element
26A, 26B guide rail
28A, 28B guide tape
30, 30' hollow tube arrangement
32, 32' hollow tube element
34A, 34B coupling element
36A, 36B bearing bush
38A, 38B bearing journal
40 central tube
41 corrugated tube
42, 42' flexible portions
44, 44' stabilizing portions
45 plastic overmolding

The invention claimed is:

1. A roller blind arrangement for a motor vehicle, the roller blind arrangement comprising:
a roller blind web and
a winding shaft onto which the roller blind web can be wound and from which the roller blind web can be unwound and which comprises a flexible hollow tube arrangement penetrated by a bearing beam attached to the vehicle,
wherein the hollow tube arrangement comprises a hollow tube element which, viewed in the axial direction, comprises multiple flexible portions interrupted by at least one stabilizing portion which provides greater torsional strength than the flexible portions;
wherein the at least one stabilizing portion of the hollow tube element comprises a plastic overmolded base tube,
wherein the base tube is a corrugated tube and its plastic overmold forms a circumferential surface whose radius is equal to a maximum outer radius of the corrugated tube,
wherein the plastic overmold is formed on the corrugated tube in an annular shape and disposed in spaces between ribs of the corrugated tube, and
wherein the at least one stabilizing portion comprises at least two stabilizing portion ribs and two spaces between the at least two stabilizing portion ribs.

2. The roller blind arrangement according to claim 1, wherein the hollow tube element is formed by a single-piece plastic tube comprising a corrugated tube portion for forming the flexible portions and a smooth tube portion for forming the at least one stabilizing portion.

3. The roller blind arrangement according to claim 1, wherein the hollow tube element is a blow-molded part.

4. The roller blind arrangement according to claim 1, wherein the roller blind web has a guide tape at each of its lateral edges with respect to a roller blind longitudinal center plane.

5. The roller blind arrangement according to claim 1, wherein the hollow tube element is provided with a bearing bush in a non-rotating manner at each of its two ends.

6. The roller blind arrangement according to claim 5, wherein a coupling element is connected in a non-rotating manner between each of the bearing bushes and the hollow tube element.

7. The roller blind arrangement according to claim 1, wherein the bearing beam is curved.

8. A roller blind arrangement for a motor vehicle, the roller blind arrangement comprising:
a roller blind web and
a winding shaft onto which the roller blind web can be wound and from which the roller blind web can be unwound and which comprises a flexible hollow tube arrangement penetrated by a bearing beam attached to the vehicle,
wherein the hollow tube arrangement comprises a hollow tube element which, viewed in the axial direction, comprises multiple flexible portions interrupted by at least one stabilizing portion which provides greater torsional strength than the flexible portions;
wherein the at least one stabilizing portion of the hollow tube element comprises a plastic overmolded base tube,
wherein the base tube is a corrugated tube and its plastic overmold forms a circumferential surface whose radius is equal to a maximum outer radius of the corrugated tube,
wherein the plastic overmold is formed on the corrugated tube in an annular shape and disposed in spaces between ribs of the corrugated tube,
wherein the hollow tube element is provided with a bearing bush in a non-rotating manner at each of its two ends,
wherein a coupling element is connected in a non-rotating manner between each of the bearing bushes and the hollow tube element, and
wherein each coupling element is formed by a plastic overmolding of the hollow tube element.

* * * * *